Dec. 11, 1928.  1,694,450
F. RICKS ET AL
METHOD OF ASSEMBLING UPPERS AND INSOLES
Original Filed Jan. 7, 1922
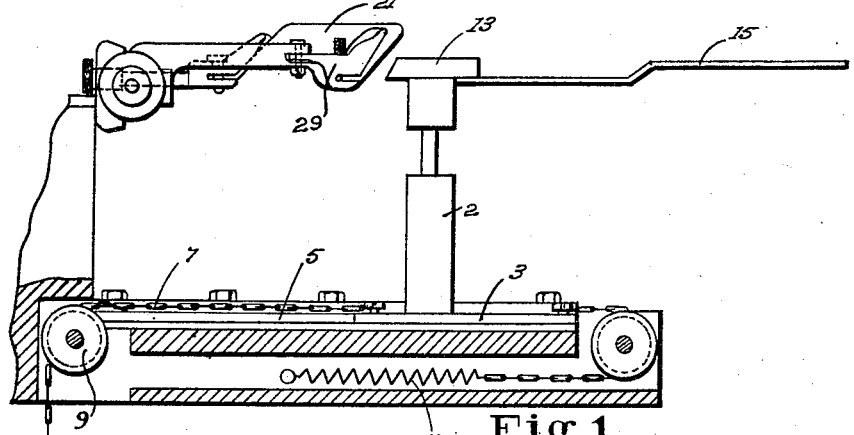
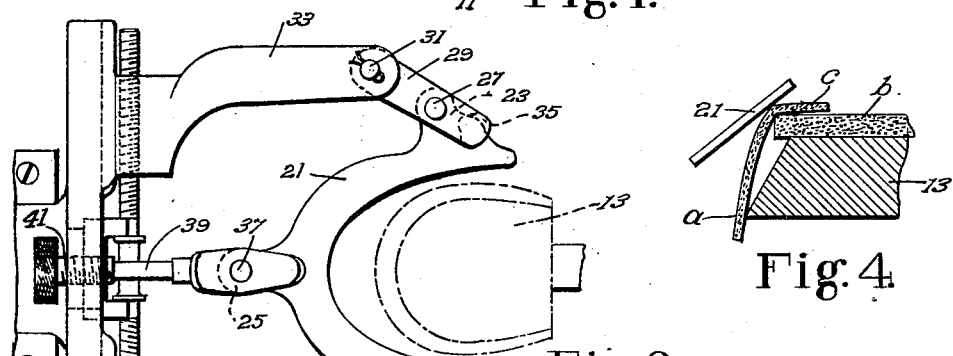
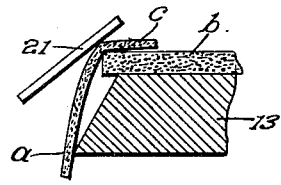
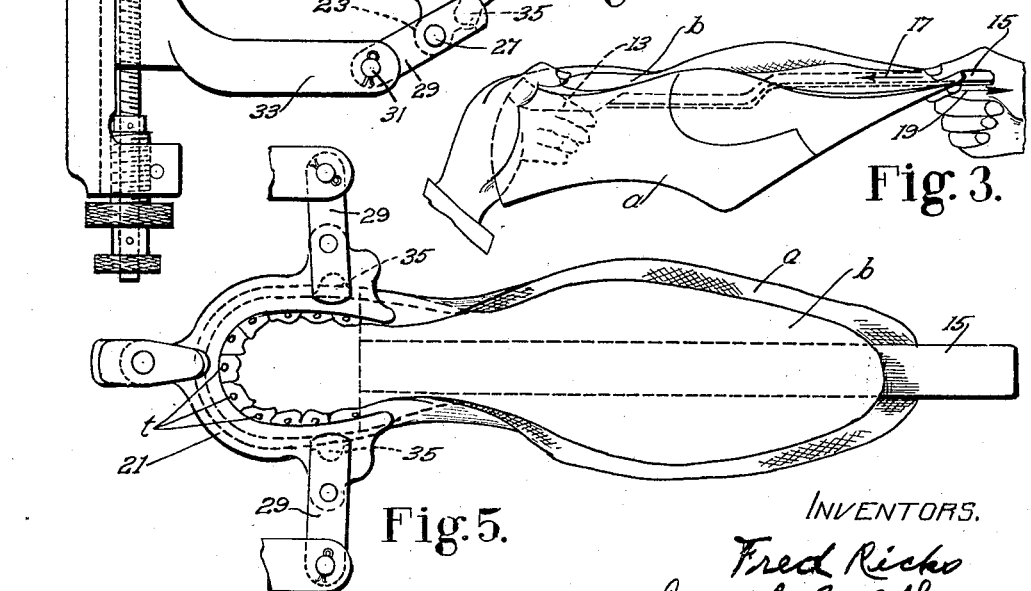
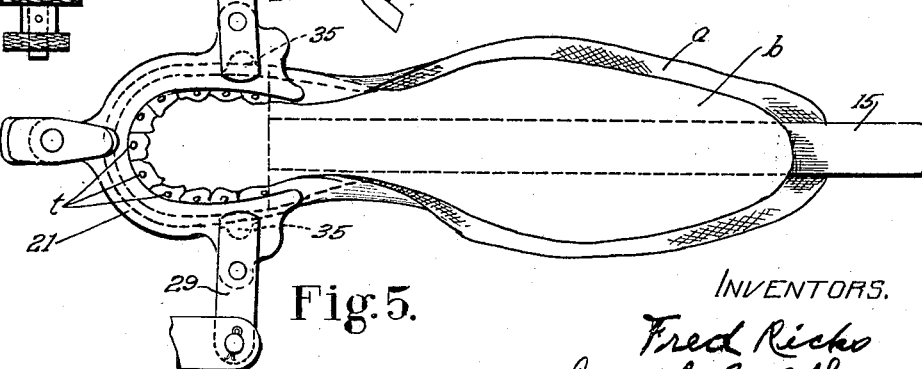
INVENTORS.
Fred Ricks
Joseph Gouldbourn
By their Attorney,
Nelson M. Howard Patented Dec. 11, 1928.

1,694,450

UNITED STATES PATENT OFFICE.

FRED RICKS AND JOSEPH GOULDBOURN, OF LEICESTER, ENGLAND, ASSIGNORS TO UNITED SHOE MACHINERY CORPORATION, OF PATERSON, NEW JERSEY, A CORPORATION OF NEW JERSEY.

METHOD OF ASSEMBLING UPPERS AND INSOLES.

Original application filed January 7, 1922, Serial No. 527,623, and in Great Britain January 12, 1921. Divided and this application filed March 16, 1927. Serial No. 175,880.

This invention relates to the manufacture of shoes, and more particularly to methods of assembling the upper with the insole or other part to which an end of the upper is permanently secured, the term "insole" being used herein as generally applicable to any such part. This application is a division of our copending application Serial No. 527,623, filed on January 7, 1922.

The invention, in one important aspect, has in view the assembling of an insole with an upper which has been previously molded at one or both ends. In methods of shoe manufacture which include, for example, the molding of the heel ends of uppers off the last, it has been the general practice after the molding operation to throw the uppers in piles where they remain until the operation of assembling them with their insoles on the lasts, an operation which for the sake of economy in last equipment and for other reasons is usually deferred for a considerable time after the molding. Such practice frequently results in more or less distortion of the molded ends of the uppers, so that they need to be reshaped to some extent before they are permanently secured to the insoles. This tends to defeat one important object of the molding operation, which is to eliminate the necessity for anything in the nature of a shaping operation on the last at the molded end of the upper, and is also objectionable because of the difficulties encountered in attempting to reshape a part of the upper which has already been once molded.

It is an object of this invention to provide a method of effecting a speedy and accurate assembling of molded uppers with their insoles and of fastening them to the insoles off the last, so that in whatever interval may elapse before the parts are mounted on the last, there will be no distortion such as to affect the relation between the molded uppers and the insoles. In order to avoid danger of distortion of the molded shape of the upper in the assembling operation off the last, the invention, in one important aspect, provides for locating the molded end of the upper in the correct relation to the end of the insole by clamping pressure which is substantially localized at the edge of the insole, with the remainder of the molded end of the upper substantially free from pressure. In its illustrated application to the assembling of insoles with uppers the heel ends of which are molded with inturned heel seat flanges, the invention further provides for positioning the molded end of the upper relatively to the insole by pressure directed both inwardly toward the edge face of the insole and transversely of its bottom face, so as to position the molded upper in the correct relation to the contour of the edge of the insole and also to press the inturned flange closely against the bottom face of the insole to receive tacks or other fastenings by which the molded end of the upper is secured to the insole while thus positioned. To facilitate the assembling operation the insole may conveniently be positioned on a suitable support, and the molded upper may conveniently be secured to the insole by tacks which will be clinched on the support, although the invention is not limited to this particular manner of fastening the parts together.

In another aspect the invention aims to facilitate the assembling of the upper and the insole in the correct lengthwise and angular relation to each other. As herein illustrated, there is utilized a member projecting between the insole and the toe end of the upper and along which the upper and the insole may readily slip, and the workman, for example by the use of one hand, will slip the insole rearwardly and the upper forwardly along this member until the heel end of the insole engages properly with the heel end of the upper. With the other hand the workman may at the same time press the molded flange of the upper down upon the heel seat face of the insole. Conveniently such a member may also serve as a gauge to indicate the proper angular relation of the upper and the insole. In this manner the molded upper and the insole may be more accurately assembled than would be as readily possible on the last.

The novel method will now be more particularly described by reference to the accompanying drawings, which show one form of apparatus adapted for use in the practice of the method, this apparatus being described in greater detail and its novel features claimed in our copending application of which this application is a division.

In the drawings,

Fig. 1 is a view of the illustrative apparatus in side elevation, with parts in section;

Fig. 2 is a plan view of the upper left-hand portion of the apparatus shown in Fig. 1;

Fig. 3 illustrates the manner of bringing the upper and the insole into the right relation before clamping the molded heel end of the upper to the edge of the insole;

Fig. 4 is a vertical section illustrating how the clamping is effected; and

Fig. 5 is a plan view showing the heel end of the upper as fastened to the insole while held in proper relation thereto.

The apparatus shown as adapted for use in practicing the method comprises a post 2 projecting upwardly from a block 3 mounted to slide in guideways 5 on the top of the column or frame of the apparatus. The block 3 is arranged to be moved rearwardly, or toward the left (Fig. 1), by means of a treadle (not shown) connected to the block by a chain 7 which passes over a pulley 9, and the block is returned to its foremost position by means of a spring 11. On the top of the post 2 and free to swivel on a vertical axis thereon is a horizontal metal block 13 for supporting the heel end of the insole. The insole-engaging face of this block is somewhat narrower than the heel end of the insole to permit the marginal edge of the insole to project beyond said face at the sides; and to facilitate a corresponding projection of the insole also at its rear end, as well as to assist in positioning the upper about the end of the insole, the block 13 is flared downwardly and outwardly from its insole-engaging face at the rear end and at the sides to engage the moulded end of the upper and hold it away from the edge of said face, as illustrated in Fig. 4. Extending forwardly from the lower face of the block 13 and fast on the block is a thin metal plate or bar 15 which is so shaped that the upper surface of its front portion is on the same level as the insole-engaging face of the block to support the forepart of the insole in the same plane as the heel end portion. It will be seen that the comparatively narrow bar 15 is positioned midway between the opposite sides of the block 13 so as to extend along the longitudinal median line of the forepart of the insole when the insole is in the right position.

For clamping the molded end of the upper against the edge of the insole there is provided a heel end embracing band or clamp member 21 of thin spring metal which is sufficiently flexible to permit it to be conformed readily to the curvature of the edge of the insole, this member being arranged to engage the opposite side portions of the molded end of the upper as far forwardly as points in advance of the heel breast line. As shown in Fig. 4, the clamp member or band 21 is flared or inclined downwardly and outwardly so that it effects substantially a line contact with the upper along the edge of the insole and acts to press the upper both inwardly against the edge face of the insole and downwardly upon its bottom face, the clamp member being arranged to engage the upper substantially along the line where its margin is turned inwardly over the heel seat, i. e., at the outer boundary of the inturned flange and opposite to the outer edge corner of the insole. The clamp member has at each end an extension 23, and at its rearmost portion an extension 25, which connects the member, without substantial loss of flexibility in a horizontal plane, to its supporting and controlling device.

The device for supporting and controlling the front end portions of the clamp member 21 comprises, at each side of the apparatus, a horizontal link 29 connected to the extension 23 by a vertical pivot 27 and mounted on a vertical pivot 31 on the front end of a rigid supporting arm 33. The front end of each link 29 has on it a boss 35 which, as that end of the link is swung inwardly by the closing of the clamp member 21, comes into contact with the outer face of the clamp member at the level of the line of contact of the latter with the work and thus buttresses the member. The arms 33 are mounted for adjustment by mechanism described in detail in the copending application. The rear extension 25 of the clamp member is connected by a vertical pivot 37 to a rod 39 which is mounted for sliding movement lengthwise in a guiding and limiting screw 41. It will thus be seen that the clamp member 21 is so mounted as to permit it to be moved bodily toward the rear by engagement of the work therewith when the work support 13 is moved rearwardly by the treadle, and that in response to such bodily movement of the clamp member its opposite side portions are swung inwardly into clamping relation to the upper and insole by the action of the links 29. In this manner the clamp member presses the molded heel end of the upper inwardly against the edge face of the insole all around the end of the insole, and at the same time presses the molded heel seat flange downwardly upon the bottom face of the insole, the clamp member assuming a lengthwise contour determined by the shape of the molded upper and the edge of the insole.

In the practice of the method of this invention by the aid of the apparatus above described, the upper $a$ is positioned with its molded heel end about the block 13 and with its forepart under the bar 15, and the insole $b$ is placed upon the top of the block 13 with its forepart resting upon the bar 15 and with its heel end under the molded inturned flange $c$ of the upper. The workman, as shown in Fig. 3, then insures with one hand that the heel end of the upper is in correct vertical relation to the insole on the support 13, his palm and fingers being free to embrace the heel end of the upper while his thumb is pressed over the inturned flange of the upper and the heel seat portion of the insole. At the same time, by the use of his other hand, he brings the parts into correct longitudinal relation by pressing with his thumb downwardly and rearwardly on the toe end of the insole, as indicated by the arrow 17, thus sliding the insole rearwardly over the bar 15 which is smooth to permit the insole to slip readily, and also draws the upper forwardly, as indicated by the arrow 19, by upward and forward pressure of the side of his forefinger against the toe end of the upper on the lower smooth face of the bar. It will be noted that the bar 15 is of such length as to project forwardly beyond the toe end of the insole and the upper, the narrow bar thus serving as a gage to assist in positioning the parts in correct longitudinal alignment.

The upper and the insole having been thus positioned, the workman withdraws his hand from the heel end of the upper and by depressing the treadle moves the support 13 with the upper and the insole rearwardly into the clamp member 21, at the same time holding the parts at the toe end pressed against the bar 15 to prevent their displacement. By the rearward movement of the work the clamp member is closed about the end of the upper and insole in the manner above described. By reason of the inclined relation of the clamp member to the plane of the insole the member serves to wedge the inturned flange of the upper down upon the insole as well as to force the upper against the edge face of the insole, as indicated in Fig. 4. The clamping pressure is thus localized at the edge of the insole, a result which is further insured by the projection of the edge of the insole beyond the insole-engaging face of the block 13. With the clamping pressure thus localized at the margin of the insole, there is no substantial tendency to distort in any way the molded shape of the upper.

While the parts are held clamped in the manner illustrated in Figs. 4 and 5, the upper is fastened to the insole, for example by heal seat tacks $t$ which may be driven in any suitable manner, as by the use of a hand tacker, the tacks being clinched on the block 13. The row of tacks, whereby the molded flange of the upper is permanently fastened to the insole, may extend as far forwardly at each side as is permissible, having regard to the later sewing operation for fastening the upper to the insole at the shank and the forepart. This eliminates the need for any subsequent repositioning of the wings of the heel stiffener which preferably will be included as a portion of the molded upper materials, and for any subsequent upper-fastening operation at the heel seat. If desired, however, the row of tacks may terminate rearwardly of the points at which the row of heel lasting tacks customarily terminate, in order to leave unsecured parts of the upper which may receive their proper adjustment by pulling-over or lasting strains applied at the forepart or the shank.

After the upper and the insole have been thus secured together, the treadle is released and the work support is moved forwardly by the spring 11. The workman then removes the connected upper and insole from the support. At any desired time thereafter the last may be introduced into the shoe and the later operations performed in the manufacture of the shoe, insurance being afforded of no objectionable distortion of the molded end of the upper by any treatment such as molded uppers ordinarily receive in the interval between the molding operation and the operation of mounting them on their lasts.

It will be understood that the invention is not limited to the manufacture of shoes of any particular type, nor in many of its aspects to operations performed at the heel end of the shoe.

Having described the novel method and set forth fully how it may be practiced, what we claim as new and desire to secure by Letters Patent of the United States is:—

1. That improvement in methods of assembling an insole with an upper having a previously molded end portion, which consists in pressing the molded end of the upper inwardly against the edge face of the insole by engaging the upper substantially at the margin of the insole while leaving the remainder of the molded end of the upper substantially free from inward pressure, and while holding the end of the upper in that position fastening it to the insole.

2. That improvement in methods of assembling an insole with an upper having a previously molded end portion, which consists in embracing the molded end of the upper off the last along a line substantially opposite to the edge face of the insole and pressing the upper inwardly against said edge face at the opposite sides of the end of the insole while leaving the remainder of the molded end of the upper substantially free from inward pressure, and fastening the upper to the insole in that position.

3. That improvement in methods of assembling an insole with an upper having a previously molded heel end portion, which consists in positioning the molded heel end of the upper off the last in the correct relation to the insole by pressure substantially localized at the margin of the insole, and while holding the upper in that position fastening its molded end to the insole.

4. That improvement in methods of assembling off the last an insole with an upper having a previously molded heel end portion provided with an inturned heel seat flange, which consists in placing the heel end of the insole upon a support, locating the molded end of the upper in the correct relation to the end of the insole by pressure directed both inwardly toward the edge face of the insole and transversely of its bottom face and localized substantially at the margin of the insole, and while holding the upper in that relation fastening its inturned flange to the insole.

5. That improvement in methods of assembling off the last an insole with an upper having a previously molded heel end portion provided with an inturned heel seat flange, which consists in placing the heel end of the insole upon an anvil member with its margin projecting beyond said member, positioning the molded end of the upper in engagement with the projecting edge face of the insole by inwardly directed pressure substantially localized at the margin of the insole, and then tacking the inturned flange of the upper to the insole over said anvil member.

6. That improvement in methods of assembling an insole with an upper having a previously molded end portion, which consists in inserting between the opposite end of the upper and the insole off the last a member along which the upper and the insole may readily slip, pressing said opposite end of the upper and the insole against said member while slipping them relatively lengthwise to locate the molded end of the upper and the corresponding end of the insole in the correct longitudinal relation, and thereafter fastening the molded end of the upper to the insole.

7. That improvement in methods of assembling an insole with an upper having a previously molded heel end portion, which consists in inserting between the toe end of the upper and the insole off the last a member along which the upper and the insole may readily slip, engaging the toe end of the upper and the insole with one hand and slipping them relatively lengthwise along said member to locate the molded heel end of the upper and the insole in the correct longitudinal relation and then holding them pressed against said member, utilizing the other hand to locate the molded end of the upper and the insole in the correct relation heightwise of the upper, and thereafter fastening the molded end of the upper to the insole.

8. That improvement in methods of assembling an insole with an upper having a previously molded heel end portion, which consists in inserting between the toe end of the upper and the insole off the last a member along which the upper and the insole may readily slip, pressing the toe end of the upper and the insole against said member while slipping them relatively lengthwise to locate the molded heel end of the upper and the insole in the correct longitudinal relation, pressing the molded end of the upper inwardly about the end of the insole while holding the toe of the upper and the insole against said member to prevent lengthwise displacement of the insole, and thereafter fastening the molded end of the upper to the insole.

9. That improvement in methods of assembling an insole with an upper having its heel end portion molded with an inturned heel seat flange, which consists in inserting between the toe end of the upper and the insole off the last a member along which the upper and the insole may readily slip, pressing the toe end of the upper and the insole against said member while slipping them relatively lengthwise to locate the heel end of the upper and the insole in the correct longitudinal relation, pressing the molded heel end of the upper inwardly about the end of the insole with its heel seat flange against the bottom face of the insole, and fastening said flange to the insole.

10. That improvement in methods of assembling an insole with an upper having a previously molded heel end portion, which consists in placing the insole loosely upon a support, mounting the molded heel end of the upper about the corresponding end of the insole and slipping the insole and the upper relatively lengthwise by engaging their toe ends to position them in the correct longitudinal relation, clamping the heel end of the upper about the end of the insole with pressure substantially localized at the margin of the insole, and while holding the upper thus clamped fastening it to the inside.

In testimony whereof we have signed our names to this specification.

FRED RICKS.
JOSEPH GOULDBOURN.